Dec. 4, 1962   JIRO MUKAI   3,066,575
HIGH APERTURE PHOTOGRAPHIC OBJECTIVES OF A SMALL ANGLE OF FIELD
Filed Sept. 12, 1960
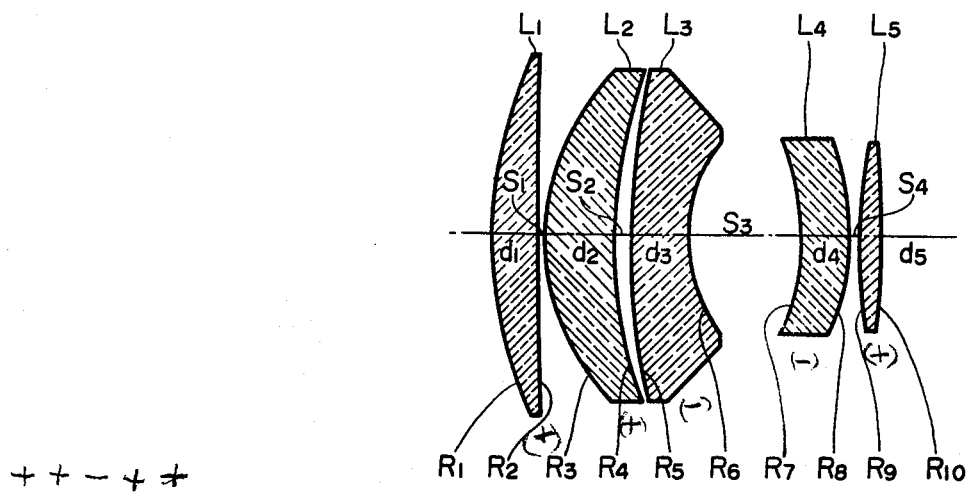
FIG. 1
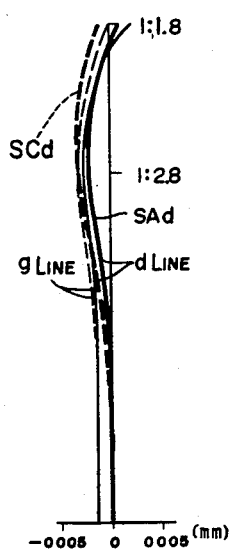
SPHERICAL ABERRATION
DEVIATION FROM SINE CONDITION
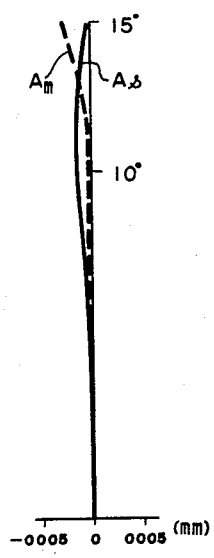
ASTIGMATISM
DISTORTION
INVENTOR.
JIRO MUKAI

United States Patent Office 3,066,575
Patented Dec. 4, 1962

3,066,575
HIGH APERTURE PHOTOGRAPHIC OBJECTIVES OF A SMALL ANGLE OF FIELD
Jiro Mukai, Yokohama City, Japan, assignor to Canon Camera Co., Inc., a corporation of Japan
Filed Sept. 12, 1960, Ser. No. 55,331
2 Claims. (Cl. 88—57)

This invention relates to high aperture photographic objectives composed of five lens elements, having an angular field of about 30 degrees, a relative aperture of about 1:1.8, a particularly comparatively short total length from the first vertex of the objective to the image plane, and a telephoto ratio of about 1:1.1, namely, the ratio of the total length to the focal length of the objective, which objectives are well corrected for spherical aberration, deviation from the sine condition, astigmatism and distortion.

Hitherto photographic objectives having an angular field of about 30 degrees and a relative aperture of about 1:1.8 have comprised six or more lens elements in order to correct well for spherical aberration, deviation from the sine condition, astigmatism and distortion.

In general, however, if we give a relative aperture of about 1:1.8 to an objective of a compartively local focal length, with an angular field of about 30 degrees, we must correct strongly not only for spherical aberration and coma but also for chromatic aberration which tends to increase with the spherical aberration and coma, and have to tolerate the disadvantages of making handling uneasy and of increasing vignetting, etc., because of the long total length of the objective.

An object of this invention is to provide a high aperture photographic objective of a small angle of field composed of five lens elements, which, while not having the stated disadvantages, does have higher performance in comparison with prior known objectives composed of six or more lens elements.

Another object of this invention is to provide a bright photographic objective having a comparatively short total length of the objective and a ratio of total objective length to focal length of about 1:1.1.

A further object of this invention is to provide a photographic objective well corrected for spherical aberration, deviation from the sine condition, astigmatism and distortion, as a result of the particular configuration and composition of its five lens elements.

The foregoing, and other objects, advantages and features of this invention will become more apparent from the following description of an illustrative embodiment in conjunction with the drawing in which:

FIG. 1 is a cross-sectional view of such embodiment according to this invention;

FIG. 2 shows the graphs of spherical aberration and deviation from the sine condition of the embodiment;

FIG. 3 is a graph of the astigmatism thereof; and

FIG. 4 is the graph of the distortion thereof.

The photographic objective embodying the present invention comprises five lens elements, $L_1$, $L_2$, $L_3$, $L_4$ and $L_5$. The first lens element $L_1$ is a positive meniscus lens, with its convex surface facing the object. The second lens element $L_2$ is a positive meniscus lens with its strongly convex surface facing the object. The third lens element $L_3$ is a negative meniscus lens with its convex surface facing the object. The fourth lens element $L_4$ is a meniscus lens with its concave surface facing the object. The fifth lens element $L_5$ is a positive lens.

The notation adopted in FIGURE 1 is such that the successive radii of curvature, counting from the front, are designated $R_1$, $R_2$, etc.; the axial thicknesses of the elements $d_1$, $d_2$, etc.; the separations of the elements, $S_1$, $S_2$, etc.; the refractive indices for the $d$-line of the spectrum, $N_1$, $N_2$, etc., for the successive elements, and the Abbe number of the elements $V_1$, $V_2$, etc.

The following numerical conditions must be observed for objectives with an effective focal length $f$ according to this invention, the radii being reckoned plus when convex to the incident light.

$$1.85 > N_1 > 1.655$$
$$0.8f > R_1 > 0.55f$$
$$0.3f > d_2 + S_2 + d_3 > 0.2f$$
$$0.1f > d_4 > 0.05f$$
$$1.85 > (N_3, N_4) > 1.68$$
$$40 > (V_3, V_4) > 26$$
$$0.4f > |R_7| > 0.25f$$
$$0.25f > S_3 > 0.13f$$

The limiting of the refractive index $N_1$ of the first lens element to the range from 1.655 to 1.85 and the limiting of the radius of the curvature $R_1$ to the range from 0.55f to 0.8, are effective to correct the spherical aberration in cooperation with the two above mentioned conditions that $0.3f > d_2 + S_2 + d_3 > 0.2f$ and $0.1f > d_4 > 0.05f$; the two latter conditions being effective to shorten the total length of the objective.

These conditions are still effective to prevent any overincrease of the Petzval sum and to improve astigmatism in conjunction with limiting the refractive indices $N_3$ and $N_4$ to the range from 1.68 to 1.85, while limiting the Abbe numbers $V_3$ and $V_4$ to the range from 26 to 40 is important to decrease or eliminate chromatic aberration. The existence of an air lens between the second lens element $L_2$ and the third lens element $L_3$, which gives the negative power, and the conditions of $$0.4f > |R_7| > 0.25f$$

and $0.25f > S_3 > 0.13f$ are effective to correct coma. The following embodiment corresponds to the embodiment illustrated in FIG. 1.

[Focal length $f=1.00$. Relative aperture 1:1.8. Angle of field=30°]

| Lens | Radius | Thickness and Spacing | Refractive index | Abbe Number |
|---|---|---|---|---|
| $L_1$ | $R_1 = 0.631$ | $d_1 = 0.079$ | $N_1 = 1.6779$ | $V_1 = 55.5$ |
|  | $R_2 = 4.316$ | $S_1 = 0.002$ |  |  |
| $L_2$ | $R_3 = 0.368$ | $d_2 = 0.115$ | $N_2 = 1.6204$ | $V_2 = 60.3$ |
|  | $R_4 = 0.740$ | $S_2 = 0.016$ |  |  |
| $L_3$ | $R_5 = 1.165$ | $d_3 = 0.119$ | $N_3 = 1.7552$ | $V_3 = 27.5$ |
|  | $R_6 = 0.240$ | $S_3 = 0.175$ |  |  |
| $L_4$ | $R_7 = -0.327$ | $d_4 = 0.083$ | $N_4 = 1.7283$ | $V_4 = 28.3$ |
|  | $R_8 = -0.384$ | $S_4 = 0.002$ |  |  |
| $L_5$ | $R_9 = 0.730$ | $d_5 = 0.030$ | $N_5 = 1.6204$ | $V_5 = 60.3$ |
|  | $R_{10} = -2.838$ |  |  |  |

It is apparent from FIGS. 2 to 4 that spherical aberration, deviation from the sine condition, astigmatism and distortion are well corrected in this objective. In FIG. 2, the full line graph SA$d$ is the spherical aberration for the spectrum $d$-line, the chain line graph SC$d$ the deviation of such $d$-line from the sine condition; in FIG. 3, the solid line graph A$s$ is the sagital field curvature and the chain line graph A$m$ the meridional field curvature; while in FIG. 4, the solid line graph D is the distortion for each angle of incidence.

It will be understood that this invention is not limited to the specific materials, figures, etc., and other details described above and illustrated in the drawing, but can be carried out with various modifications without departing from the spirit and scope of the invention, as defined in the appended claims.

What I claim is:

1. A photographic objective composed of a positive meniscus first lens element with its convex surface toward the object side of the objective, a positive meniscus second lens element with its strongly convex surface toward the object side, a negative meniscus third lens element with its convex surface toward the object side, a meniscus fourth lens element with its concave surface toward the object side and a positive fifth lens element, the objective meeting the following conditions:

$$1.85 > N_1 > 1.655$$
$$0.8f > R_1 > 0.55f$$
$$0.3f > d_2 + S_2 + d_3 > 0.2f$$
$$0.1f > d_4 > 0.05f$$
$$1.85 > (N_3, N_4) > 1.68.$$
$$40 > (V_3, V_4) > 26$$
$$0.4f > |R_7| > 0.25f, \text{ and}$$
$$0.25f > S_3 > 0.13f$$

where $f$ is the effective focal length of this objective, $R_{subscript}$ the radius of curvature of the surface of the lens element in the order of alignment from the object side, $d_{subscript}$ the thickness of the lens element in such order, $S_{subscript}$ the separation of the elements in such order, $N_{subscript}$ the refractive index on the spectrum $d$-line of the lens element in such order, and $V_{subscript}$ the Abbe number of the lens element in such order.

2. A photographic objective of small angle of field composed of five lens elements:

[Focal length $f$=1.00. Relative aperture 1:1.8. Angle of field=30°]

| | | | | |
|---|---|---|---|---|
| $L_1$ | $R_1$ =0.631 | $d_1$=0.079 | $N_1$=1.6779 | $V_1$=55.5 |
| | $R_2$ =4.316 | $S_1$=0.002 | | |
| $L_2$ | $R_3$ =0.368 | $d_2$=0.115 | $N_2$=1.6204 | $V_2$=60.3 |
| | $R_4$ =0.740 | $S_2$=0.016 | | |
| $L_3$ | $R_5$ =1.165 | $d_3$=0.119 | $N_3$=1.7552 | $V_3$=27.5 |
| | $R_6$ =0.240 | $S_3$=0.175 | | |
| $L_4$ | $R_7$ =-0.327 | $d_4$=0.083 | $N_4$=1.7283 | $V_4$=28.3 |
| | $R_8$ =-0.384 | $S_4$=0.002 | | |
| $L_5$ | $R_9$ =0.730 | $d_5$=0.030 | $N_5$=1.6204 | $V_5$=60.3 |
| | $R_{10}$ =-2.838 | | | | where $L_{subscript}$ is the lens element in order of alignment from the object side of the objective; $R_{subscript}$ is the radius of curvature of the surface of the lens element in such order; $d_{subscript}$ the thickness of the lens element in such order; $S_{subscript}$ the separation of the elements in such order; $N_{subscript}$ the refractive index on the spectrum $d$-line of the lens element in such order; and $V_{subscript}$ the Abbe number of the lens element in such order.

References Cited in the file of this patent
UNITED STATES PATENTS 2,528,212    Cook    Oct. 31, 1950
2,720,139    Tronnier    Oct. 11, 1955